United States Patent

Ohkubo

[11] Patent Number: 4,813,300
[45] Date of Patent: Mar. 21, 1989

[54] POWER TRANSMISSION WITH TORQUE CONVERTER

[75] Inventor: Masahiro Ohkubo, Kadoma, Japan

[73] Assignee: Kabushiki Kaisha Daikin Seisakusho, Neyagawa, Japan

[21] Appl. No.: 82,919

[22] Filed: Aug. 6, 1987

Related U.S. Application Data

[63] Continuation of Ser. No. 775,564, Sep. 13, 1985, abandoned.

[30] Foreign Application Priority Data

Sep. 17, 1984 [JP] Japan .................. 59-195410

[51] Int. Cl.[4] ........................................... F16H 47/00
[52] U.S. Cl. ........................... 74/718; 74/331; 74/688; 74/730
[58] Field of Search .............. 74/331, 718, 720, 730, 74/677, 687, 688; 60/341, 345, 362

[56] References Cited

U.S. PATENT DOCUMENTS

| | | | |
|---|---|---|---|
| 2,042,189 | 5/1936 | Rabe | 60/362 |
| 2,623,411 | 12/1952 | Herndon | 74/730 |
| 2,685,169 | 8/1954 | Saives | 60/362 |
| 3,102,435 | 9/1963 | Shealy | 74/730 |
| 3,238,814 | 3/1966 | Jandasek | 74/718 |
| 3,256,751 | 6/1966 | Tuck et al. | 74/718 |
| 3,426,662 | 2/1969 | Tuck | 74/730 |
| 3,526,155 | 9/1970 | Waclawek | 74/718 |

FOREIGN PATENT DOCUMENTS

2627844 1/1977 Fed. Rep. of Germany ........ 74/688

OTHER PUBLICATIONS

Shinko Engineering Co. Ltd., *Power Shift Transmissions, CM Series*, 50-450 HP, pp. 3 and 5.

*Primary Examiner*—Rodney H. Bonck
*Assistant Examiner*—David A. Testardi
*Attorney, Agent, or Firm*—Armstrong, Nikaido Marmelstein & Kubovcik

[57] ABSTRACT

A transmission having a two-stage torque converter with a turbine and two stators, a one-way clutch and a stator shaft, one of the stators being connected to the stator shaft through the one-way clutch. The reverse drive of the stator connected to the stator shaft through the one-way clutch is interconnected to and disconnected from the drive of the turbine through counter gear mounted on counter shafts selectively interconnected and selectively disconnected through clutches mounted on the counter shafts.

2 Claims, 3 Drawing Sheets

POWER TRANSMISSION WITH TORQUE CONVERTER

This application is a continuation of application Ser. No. 775,564 filed Sept. 13, 1985, now abandoned.

FIELD OF THE INVENTION

This invention relates to a power transmission with torque converter suitable for an industrial or construction machine requiring a large torque ratio.

DESCRIPTION OF THE PRIOR ART

In case of a power transmission with torque converter having a four-element two-stage torque converter in which a first stator is interconnected to an output shaft and a second stator is fixed, a larger torque ratio is obtainable than a transmission equipped with a three-element torque converter utilizing a reaction force of the first stator. The workability of a construction machine etc. can be improved with such four-element torque converter and troublesome operations for the operator can be reduced.

In FIG. 6, illustrating a conventional embodiment, a torque converter 11 includes two stators 12 & 13, and the one-side second stator 13 is fixed to a transmission case 14. The other-side first stator 12 is interconnected through a one-way clutch 15 to a stator shaft 17 concentric with a central turbine shaft 16. The stator shaft 17 and the turbine shaft 16 coupled to a turbine 18 are interconnected to each other through means of plural counter gears 19, and respective counter gears 19 are fixed to and carried by totally three counter shafts 20. Three clutches 21 are equipped to the counter shafts 20 to provide for a selection of two forward gears and backward gear by controlling the clutch 21. A torque obtained by controlling the clutch 21 can be taken out from an output shaft 22. Incidentally, a PTO shaft 24 is connected to a pump 23 of the torque converter 11.

SUMMARY OF THE INVENTION (Disadvantages)

Since many counter shafts and gears become necessary in the above conventional construction, there are disadvantages not only that the unit becomes complicated and costly but that the size of unit becomes large.

An object of this invention is to remedy the above disadvantages.

(Measures to remedy the disadvantage)

A power transmission with torque converter having a four-element two-stage torque converter, in which two stators are equipped, and a stator shaft interconnected to one-side stator and a turbine shaft coupled to a turbine are interconnected each other through counter gears; characterized by that said power transmission includes two counter shafts provided with said counter gears through which a reverse rotational power of the stator and a forward rotational power of the turbine are composed, and a composed power is taken out from any two or three of the two counter shafts and said turbine shaft through clutches.

DETAILED DESCRIPTION OF THE INVENTION

Figure 1:
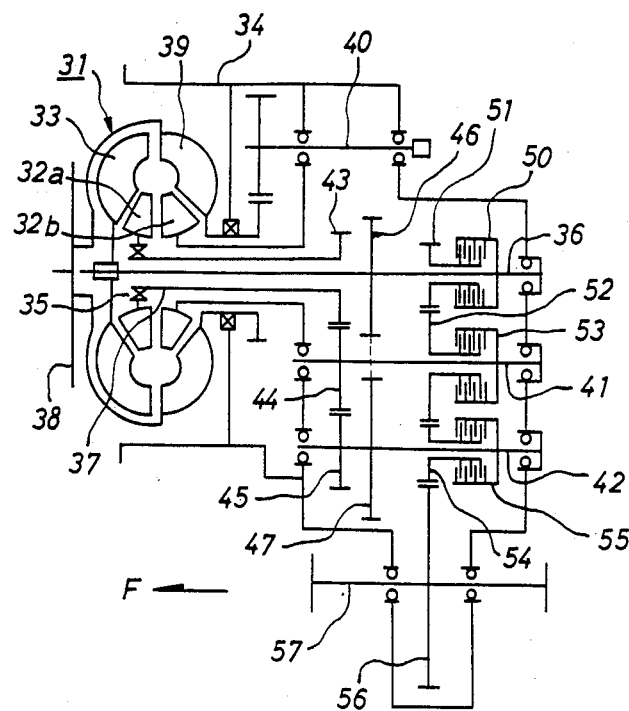
FIG. 1 is a vertical sectional skelton diagram of a power transmission with torque converter according to this invention.

In FIG. 1 (arrow F indicating forward side), a torque converter 31 includes two stators 32a & 32b stator 32b is fixed to transmission case 34. Stator 32a is connected through a one-way clutch 35 to a stator shaft 37 concentric with a central turbine shaft 36. A PTO shaft 40 is connected through a gear to a pump 39 fixed to a flywheel 38 of not-shown engine. The front end of turbine shaft 36 is coupled to turbine 33 of the torque converter 31 by means of a spline-fit. The a rear end of the turbine shaft 36 is rotatably supported by the transmission case 34 through a bearing.

A first counter shaft 41 and a second counter shaft 42, both being parallel with the rear end of the turbine shaft 36, are disposed parallel to each other with a space provided therebetween. Counter shafts 41 & 42 are rotatably supported by the transmission case 34 through bearings. A gear 43 is provided at a rear end of the stator shaft 37. Gear 43 meshes with a counter gear 44 fixed to a front part of the first counter shaft 41. Counter gear 44 meshes also with a counter gear 45 fixed to a front part of the second counter shaft 42. A gear 46 fixed to the turbine shaft 36 is disposed at a rear part of the gear 43. Gear 46 meshes with a counter gear 47 fixed to the second counter shaft 42.

Drive plate side of clutch 50 is fixed to rear end of the turbine shaft 36. Driven plate side part of the clutch 50 is fixed to a gear 51 fitting rotatably onto the turbine shaft 36. The gear 51 meshes with a gear 52 fitting rotatably onto the first counter shaft 41. Gear 52 is fixed to a driven plate side part of a clutch 53. A drive plate side part of the clutch 53 is fixed to a rear end of the first counter shaft 41. Further, the gear 52 meshes with a gear 54 fitting rotatably onto the second counter shaft 42 the gear 54 is fixed to a driven plate side part of a clutch 55. A drive plate side part of the clutch 55 is fixed to a rear end of the second counter shaft 42.

Further, the gear 54 meshes with the gear 56. Gear 56 is fixed to an output shaft 57 parallel with the second counter shaft 42. Moreover, the output shaft 57 is supported rotatably by the transmission case 34 through bearings power can be taken out from a portion of shaft 57 projecting out of the transmission case 34.

Function of the transmission will be described hereunder. When torque is transmitted from the not-shown engine to the torque converter 31, an output from the pump 39 is always given to the PTO shaft 40. A rotation of the pump 39 is transmitted through a working oil filled in the torque converter 31 to the turbine 33 and further to the turbine shaft 36.

Figure 5:
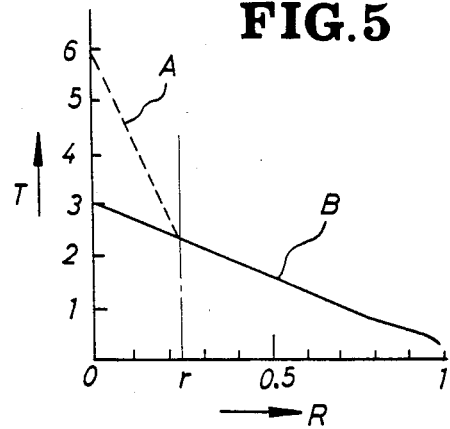
FIG. 5 is a graph showing a relation between a speed ratio and a torque ratio.

FIG. 5 is a graph showing a relation between a speed ratio R and a torque ratio T. In case of a low speed ratio R, i.e. a speed ratio R being smaller than a speed ratio r; the first stator 32a of FIG. 1 receives a force reverse to the rotational direction of the turbine 33 to transmit a power through the one-way clutch 35 to the stator shaft 37. The reversely rotating stator shaft 37 is interconnected through the gears 43, 44, 45, second counter shaft 42, gears 47 & 46 to the turbine shaft 36 in such a condition that the turbine shaft rotates in the same direction as the turbine 33. Consequently, the torque input of stator shaft 37 is added to the torque input of turbine shaft 36 so that, in case when the speed ratio R is smaller than the speed ratio r, the converter develops characteristic A, as shown in FIG. 5 to provide a large torque ratio T. On the contrary, in case when the speed ratio R is larger than the speed ratio r, the first stator 32a of FIG. 1 receives a force in the same direction as the rotation of the turbine 33, one-way clutch 35 idles stator shaft 37 of stator 32a and the torque is not transmitted to stator shaft 37 nor added to the torque input of turbine shaft 36. Accordingly, in this case the converter develops a characteristic B of FIG. 5 to provide a comparatively small torque ratio T.

Here, only the clutch 55 is turned to "ON" (engaged) state in order to obtain a forward first gear. The torque from the turbine shaft 36 is transmitted through the gears 46 & 47 to the second counter shaft 42. Then, the torque from the turbine shaft 36 is transmitted to the clutch 55 together with a torque transmitted through the gears 43, 44 & 45 and received by the first stator 32a in case when the speed ratio R of FIG. 5 is smaller than the speed ratio r, and it is directly transmitted to the clutch 55 in case when the speed ratio R is larger than the speed ratio r. The torque transmitted to the clutch 55 is transmitted through the gears 54 & 56 to the output shaft 57, and an output of forward first gear can be obtained from the output shaft 57.

In the second stage, the clutch 55 is turned to "OFF" (disengaged) state and the clutch 53 is turned to "ON" state in order to obtain a forward second gear. The torque from the turbine shaft 36 is transmitted through the gears 46 & 47, second counter shaft 42, gears 45 & 44 to the first counter shaft 41. Then, the torque from the turbine shaft 36 is transmitted to the clutch 53 together with a torque transmitted through the gears 43 & 44 and received by the first stator 32a in case when the speed ratio R of FIG. 5 is smaller than the speed ratio r, and it is directly transmitted to the clutch 53 in case when the speed ratio R is larger than the speed ratio r. The torque transmitted to the clutch 53 is transmitted through the gears 52, 54 & 56 to the output shaft 57, and an output of forward second gear can be obtained from the output shaft 57.

In order for obtaining a backward output, only the clutch 50 is to be turned to "ON" state. The torque from the turbine 33 received by the turbine shaft 36 is transmitted to the clutch 50 together with a torque transmitted through the gears 43, 44 & 45, second counter shaft 42, gear 47, gear 46 and received by the first stator 32a in case when the speed ratio R of FIG. 5 is smaller than the speed ratio r, and it is directly transmitted to the clutch 50 in case when the speed ratio R is larger than the speed ratio r. The torque transmitted to the clutch 50 is transmitted through the gears 51, 52, 54 & 56 to the output shaft 57, and an output of backward gear can be obtained from the output shaft 57.

(Effect of the invention)

In the power transmission with torque converter having the four-element two-stage torque converter, in which the two stators 32a & 32b are equipped and the stator shaft 37 connected to the one-side stator and the turbine shaft 36 coupled to the turbine 33 are interconnected each other through the counter gears 44, 45 & 47; the power transmission includes the two counter shafts 41 & 42 provided with counter gears 44, 45 & 47 through which the reverse rotational power of the stator 32a and the forward rotational power of the turbine 33 are composed, and a composed power is taken out from any two or three of the two counter shafts 41 & 42 and the turbine shaft 36 through clutches 50, 53 & 55. Therefore, the following advantages become obtainable.

Figure 6:
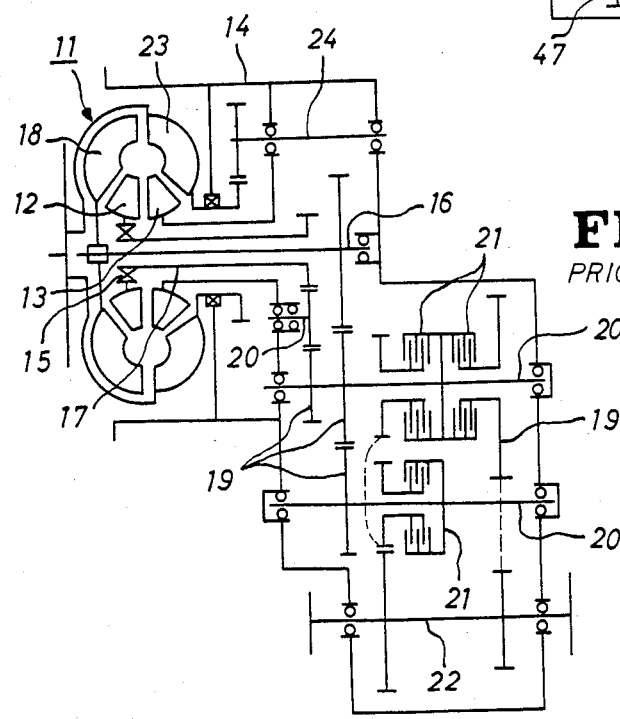
FIG. 6 is a vertical sectional skelton diagram of a conventional power transmission.

(a) A number of the counter shaft can be lessened as compared with the conventional power transmission with torque converter. Namely, the three counter shafts 20 are required between the turbine shaft 16 and the output shaft 22 in case of the conventional construction as shown in FIG. 6 for example, but only two shafts are required for the present invention in order to obtain the same transmission function.
(b) Further, the number of counter gear can be lessened in this connection.
(c) As a result, the size of power transmission with torque converter can be minimized and its simplified construction allows a reduction in manufacturing cost.

(Another embodiment)

Figure 2:
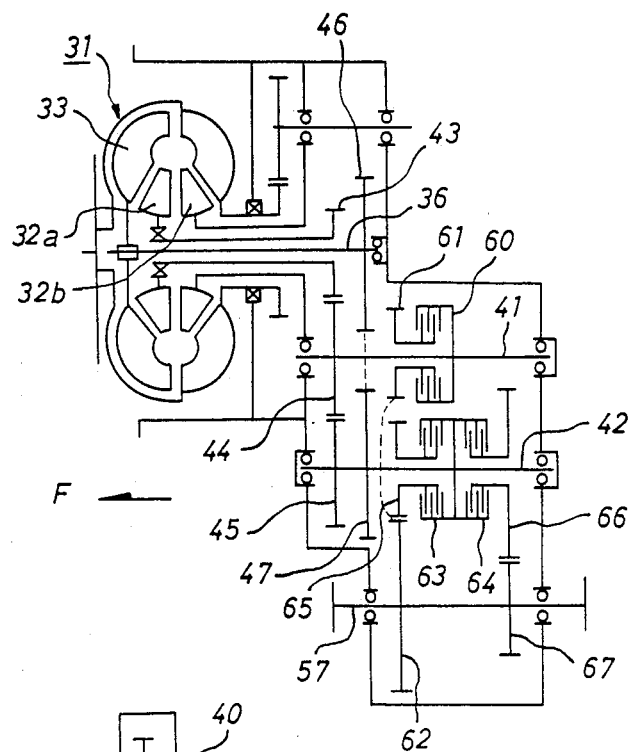
FIG. 2, FIG. 3 and FIG. 4 are vertical sectional partial diagrams of other embodiments respectively.

(a) A construction as shown by FIG. 2 may be employed in place of that of FIG. 1. In FIG. 2, a drive plate side part of a clutch 60 is fixed to the first counter shaft 41, and a driven plate side part of the clutch 60 is fixed to a gear 61 rotatably fitting onto the first counter shaft 41. The gear 61 meshes with a gear 62 fixed to the output shaft 57. While, the second counter shaft 42 is fixed to drive plate side parts of a clutch 63 and a clutch 64 which are formed integrally. A driven plate side part of the clutch 63 is fixed to a gear 65 fitting rotatably onto the second counter shaft 42, and the gear 65 meshes with the gear 62. A driven plate side part of the clutch 64 is fixed to a gear 66 fitting rotatably onto the counter shaft 42, and the gear 66 is fixed to a gear 67 fixed to the output shaft 57.

Figure 3:
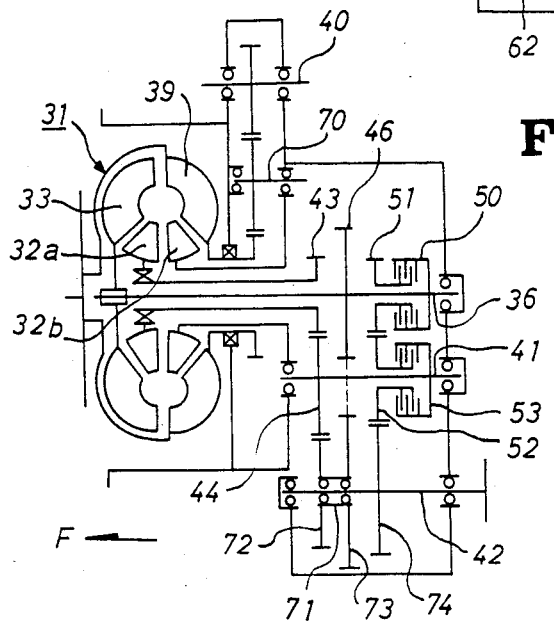

In this embodiment, the output of forward first gear is obtained by turning only the clutch 63 to "ON" state, the output of forward second gear is obtained by turning only the clutch 64 to "ON" state, and the output of backward gear is obtained by turning only the clutch 60 to "ON" state. Further, similarly to the embodiment of FIG. 1, a large torque ratio T is obtainable in a state of low speed ratio R and a comparatively small torque ratio T is obtainable in a state of high speed ratio R.
(b) A construction as shown by FIG. 3 may be employed. In FIG. 3, the PTO shaft 40 is interconnected to the pump 39 through a shaft 70. A counter gear 72 fixed to a cylindrical shaft 71 fitting rotatably onto the second counter shaft 42 meshes with the counter gear 44 fixed to the first counter shaft 41, and a counter gear 73 fixed to the cylindrical shaft 71 meshes with the gear 46. The clutch 55 (FIG. 1) is not provided on the second counter shaft 42, but a gear 74 fixed to the second counter shaft 42 meshes with the gear 52. The second counter shaft serves also as the output shaft, so that a member corresponding to the output shaft 51 of FIG. 1 does not exist.

Figure 4:
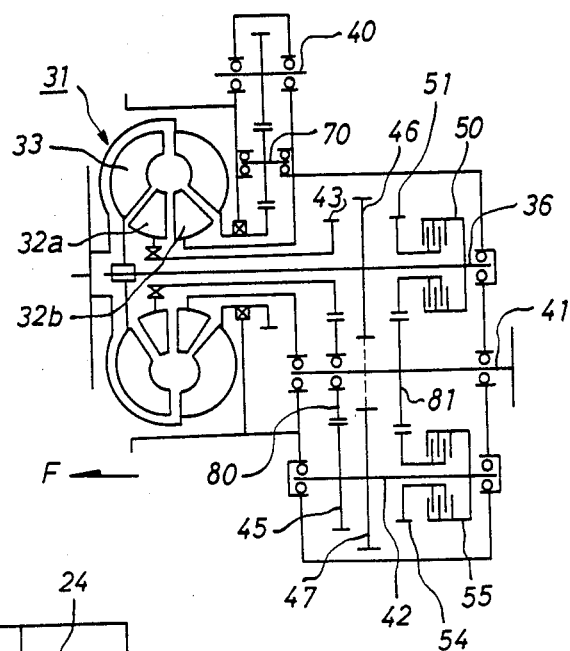

In this embodiment, the output of forward gear is obtained by turning only the clutch 50 to "ON" and the backward gear output is obtained by turning only the clutch 53 to "ON". Similarly to the embodiment of FIG. 1, a large torque ratio T is obtainable in a state of low speed ratio R and a comparatively small torque ratio T is obtainable in a state of high speed ratio R.
(c) A construction as shown by FIG. 4 may be employed. In FIG. 4, the gear 43 meshes with a counter gear 80 fitting rotatably onto the first counter shaft 41, and the counter gear 80 in turn meshes with the counter gear 45 fixed to the second counter shaft 42. A clutch corresponding to the clutch 53 of FIG. 1 is not provided on the first counter shaft 41, but a gear 81 meshing with the gear 51 and the gear 54 is fixed to the first counter shaft 41. The first counter shaft 41 serves also as the output shaft, so that a member corresponding to the output shaft 57 of FIG. 1 does not exist.

In this embodiment, the output of backward gear is obtained by turning only the clutch 50 to "ON" and the output of forward gear is obtained by turning only the clutch 55 to "ON". Similarly to the embodiment of FIG. 1, a large torque ratio T is obtainable in a state of low speed ratio R and a comparatively small torque ratio T is obtainable in a state of high speed ratio R.

What is claimed is:

1. A power transmission having a four-element, two-stage torque converter with a turbine and two stators, a one-way clutch, a stator shaft connected to one of said stators through said one-way clutch and a turbine shaft coupled to said turbine, said stator shaft and said turbine shaft being interconnected through counter gears; characterized in that said power transmission includes two counter shafts, said turbine shaft and each of said counter shafts having mounted thereon at least one of said counter gears, and clutch means on said turbine shaft and each of said counter shafts for selectively interconnecting and selectively disconnecting each of said turbine shaft and said two counter shafts with an output shaft for combining a forward rotational power of said turbine and said turbine shaft with a reverse rotational power of said one stator and said stator shaft for forward drive of said transmission and for combining said forward rotational power of said turbine and said turbine shaft with said reverse rotational power of said one stator and said stator shaft for reverse drive of said transmission.

2. A power transmission with torque converter as set forth in claim 1, wherein said two counter shafts include a first counter shaft and a second counter shaft, said counter shafts being disposed parallel to said turbine shaft, said counter shafts being rotatably disposed relative to each other with a space therebetween, said stator shaft and said first counter shaft being interconnected through gears, said first counter shaft and said second counter shaft being interconnected through gears, said turbine shaft and said second counter shaft being interconnected through gears, said clutch means on said turbine shaft having drive plates fixed to said turbine shaft and driven plates interconnected through gears with driven plates of said clutch means on said first counter shaft, drive plates of said clutch means on said first counter shaft being fixed to said first counter shaft, said driven plates of said first counter shaft clutch means being interconnected through gears with driven plates of said clutch means on said second counter shaft, drive plates of said clutch means on said second counter shaft being fixed to said second counter shaft, said driven plates of said second counter shaft clutch means being interconnected through gears with said output shaft.

* * * * *